US010885036B2

(12) United States Patent
Elias et al.

(10) Patent No.: US 10,885,036 B2
(45) Date of Patent: Jan. 5, 2021

(54) OBTAINING INCREMENTAL UPDATES FROM A DATABASE USING A PARTIAL QUERY

(71) Applicant: Red Hat, Inc., Raleigh, NC (US)

(72) Inventors: Filip Elias, Vysni Lhoty (CZ); Filip Nguyen, Brno (CZ)

(73) Assignee: RED HAT, INC., Raleigh, NC (US)

( * ) Notice: Subject to any disclaimer, the term of this patent is extended or adjusted under 35 U.S.C. 154(b) by 667 days.

(21) Appl. No.: 14/613,007

(22) Filed: Feb. 3, 2015

(65) Prior Publication Data

US 2016/0224641 A1 Aug. 4, 2016

(51) Int. Cl.
G06F 16/2455 (2019.01)
G06F 16/23 (2019.01)

(52) U.S. Cl.
CPC .... G06F 16/24552 (2019.01); G06F 16/2358 (2019.01)

(58) Field of Classification Search
CPC .............. G06F 17/3048; G06F 17/30368
USPC ............................................. 707/722
See application file for complete search history.

(56) References Cited

U.S. PATENT DOCUMENTS

| 7,912,853 | B2 | 3/2011 | Agrawal |
| 7,966,311 | B2 | 6/2011 | Haase |
| 8,019,735 | B2 | 9/2011 | White |
| 8,473,450 | B2 | 6/2013 | Bakalash et al. |
| 8,650,183 | B2 | 2/2014 | Murthy |
| 8,713,043 | B2 | 4/2014 | Hess |
| 8,793,241 | B2 | 7/2014 | Koch et al. |
| 2006/0271510 | A1* | 11/2006 | Harward ........... G06F 17/30306 707/999.002 |
| 2009/0144258 | A1 | 6/2009 | Taylor |
| 2011/0314021 | A1* | 12/2011 | Gibbs ................ G06F 17/3064 707/737 |
| 2012/0023067 | A1* | 1/2012 | Clegg ............... G06F 17/30575 707/634 |
| 2013/0262436 | A1 | 10/2013 | Barsness et al. |
| 2014/0310232 | A1* | 10/2014 | Plattner ............. G06F 17/30457 707/602 |
| 2015/0074040 | A1* | 3/2015 | Bhattacharjee ....... G06F 16/283 707/607 |

(Continued)

FOREIGN PATENT DOCUMENTS

CN 102789475 A * 11/2012

OTHER PUBLICATIONS

Distributed Caching, 7 pages, retrieved from http://gridgain.com/developer-central/in-memory-data-fabric/in-memory-data-grid/distributed-caching/ on Feb. 3, 2015.

Primary Examiner — Alicia M Antoine
(74) Attorney, Agent, or Firm — Haynes and Boone, LLP

(57) ABSTRACT

An example method of processing a query includes receiving a partial query including an identifier that identifies a full query corresponding to the partial query. The partial query is sent from a client and includes a command to select data from a database table stored in a database. The method also includes determining whether the table has been updated since a previous result set was sent to the client. The method further includes generating a partial result set including an indication of the updates to the table since the previous result set was sent to the client. The method also includes sending the partial result set to the client. The partial result set is an incomplete result set of the partial query.

14 Claims, 8 Drawing Sheets

(56) References Cited

U.S. PATENT DOCUMENTS

| | | | |
|---|---|---|---|
| 2015/0379038 A1* | 12/2015 | Nikolov | G06F 17/30191 |
| | | | 707/622 |
| 2016/0063118 A1* | 3/2016 | Campbell | G06F 17/30867 |
| | | | 707/722 |
| 2016/0198016 A1* | 7/2016 | Tiger | H04L 47/823 |
| | | | 709/213 |

* cited by examiner

OBTAINING INCREMENTAL UPDATES FROM A DATABASE USING A PARTIAL QUERY

FIELD OF DISCLOSURE

The present disclosure generally relates to processing queries, and more specifically to providing a result set including incremental updates to a database.

BACKGROUND

A client may send requests for data stored in a database. For example, a client may send a query to the database, and the database may execute the query and send a result set back to the client. The time it takes a database to process a query and send the result set of the query back to the client may be significant. Accordingly, it may be desirable to reduce the load on a database or reduce the amount of data that is transmitted between the client and database.

BRIEF SUMMARY

Methods, systems, and techniques for processing a query are provided.

According to some embodiments, a method of processing a query includes receiving, at a database server, a partial query including an identifier that identifies a full query corresponding to the partial query. The partial query is sent from a client and includes a command to select data from a database table stored in a database. The method also includes determining whether the table has been updated since a previous result set was sent to the client. The method further includes generating a partial result set including an indication of the updates to the table since the previous result set was sent to the client. The method also includes sending the partial result set to the client. The partial result set is an incomplete result set of the partial query.

According to some embodiments, a system for processing a query includes a query processor that receives a partial query including an identifier that identifies a full query corresponding to the partial query. The partial query is sent from a client and includes a command to select data from a database table stored in a database. The system also includes an updater that determines whether the table has been updated since a previous result set was sent to the client, generates a partial result set including an indication of the updates to the table since the previous result set was sent to the client, and sends the partial result set to the client. The partial result set is an incomplete result set of the partial query.

According to another embodiment, a machine-readable medium includes a plurality of machine-readable instructions that when executed by one or more processors is adapted to cause the one or more processors to perform a method including: receiving a partial query including an identifier that identifies a full query corresponding to the partial query, the partial query being sent from a client and including a command to select data from a database table stored in a database; determining whether the table has been updated since a previous result set was sent to the client; generating a partial result set including an indication of the updates to the table since the previous result set was sent to the client; and sending the partial result set to the client, the partial result set being an incomplete result set of the partial query.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
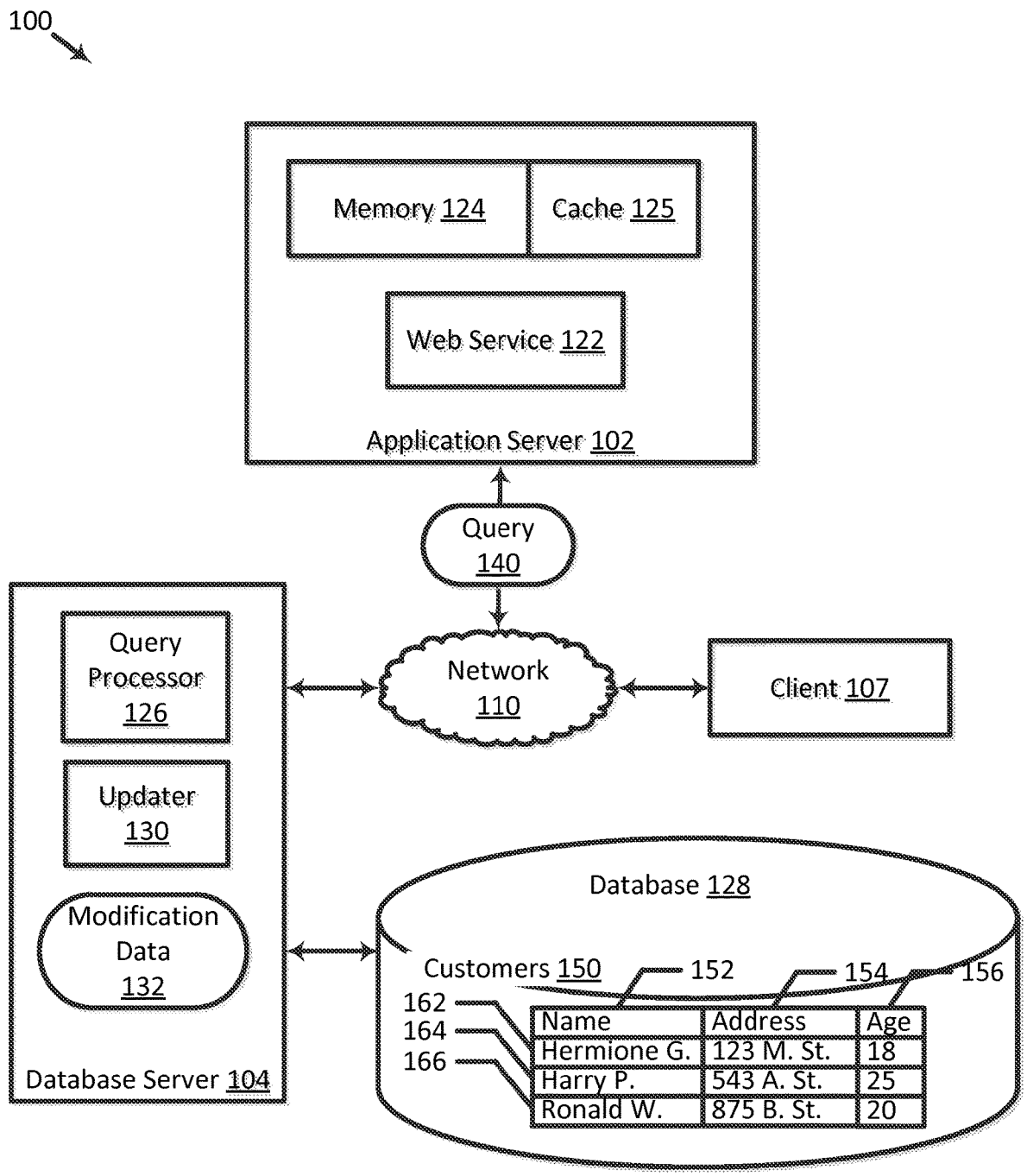
FIG. 1 is a block diagram illustrating a system for processing a query, according to some embodiments.

I. Overview
II. Example System Architecture
III. The Web Service May Submit a Full Query or a Partial Query
IV. Process the Query
   A. Process a Full Query that Selects Data From the Database
   B. Process a Partial Query that Selects Data From the Database
   C. Process a Modification Data that Modifies the Database
   D. Retrieve the Partial Result Set of the Query
      1. Insert Modification Query
      2. Delete Modification Query
      3. Update Modification Query
V. Example Method
VI. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The present disclosure provides techniques to reduce the load on a database and reduce the amount of data that is transmitted between the client and database. In an example, a web service may communicate with a database server to process queries based on client requests. The web service may submit multiples queries to the database, and some of these queries may be the same. For example, a query may request the names and addresses of customers over 20 years old. In this example, this data (name, address, and age) may be stored in one or more tables that are updated. Customers may be added, removed, or their information updated. The present disclosure provides techniques to track changes to the table so that subsequently received queries that request the names and addresses of customers over 20 years old may include only the incremental updates since the most recent result set was sent to the client.

A query may include a flag indicating whether it is a full query or a partial query. Partial and full queries include the same data selection commands and are the same query, not taking into account the flag and full query identifier included in the partial query. A full query returns a full result set, and a partial query returns a partial result set, which may be an incomplete result set of the query. A full query and partial query select values from the same table and include the same conditions. However, the flag in the full query indicates that it is a full query, and the flag and full query identifier in the partial query indicate that it is a partial query.

In an example, a web service may submit a full query or a partial query to the database server. The submitted query may be based on a client invoking the services of the web service. A full query indicates to the database server that the web service desires to receive a full result set of the query. The web service receives the full result set and caches it. A partial query indicates to the database server that the web service desires to receive a partial result set of the query. The partial result set includes incremental updates to the table since a previous result set was sent to the web service. The web service merges the full result set and the partial result set to determine a final result set, and sends the final result set to a client. At a later point in time, if the web service sends another partial query, the web service may already have some of the result set cached and receive incremental updates in a partial result set. The cached result set may be supplemented with information from the partial result set to arrive at the final result set of the query.

According to some embodiments, a system for processing a query includes a query processor that receives a partial query including an identifier that identifies a full query corresponding to the partial query. The partial query is sent from a client and includes a command to select data from a database table stored in a database. The system also includes an updater that determines whether the table has been updated since a previous result set was sent to the client, generates a partial result set including an indication of the updates to the table since the previous result set was sent to the client, and sends the partial result set to the client. The partial result set is an incomplete result set of the partial query.

The present disclosure provides techniques to process a plurality of queries. Unless specifically stated otherwise, as apparent from the following discussion, it is appreciated that throughout the description, discussions utilizing terms such as "determining," "generating," "sending," "receiving," "executing," "obtaining," "storing," "tracking," "updating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

FIG. 1 is a block diagram illustrating a system 100 for processing a query, according to some embodiments. System 100 includes an application server 102, database server 104, and client 107 coupled over a network 110. Although one application server and one database server are illustrated, this is not intended to be limiting, and system 100 may include one or more application servers and/or database servers.

Network 110 may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

Application server 102 includes a web service 122, memory 124, and cache 125. Web service 122 is deployed on application server 102 and may help to solve the interoperability problem between applications developed by different languages or on different platforms. Web service 122 may use open protocols such as HTTP, Extensible Markup Language (XML), or Simple Object Access Protocols (SOAP), and is self-contained and self-describing. Web service 122 may be described by a Web Services Description Language (WSDL) interface including the definitions for port types, operations, and message types for web service 122. Although one web service 122 is illustrated as being deployed on application server 102, this is not intended to be limiting and more than one web service may be deployed on application server 102.

Database server 104 includes a query processor 126 and updater 130. Query processor 126 processes requests from one or more application servers and/or one or more web services. Database server 104 is coupled to a database 128 that one or more clients (e.g., client 107) desire to access. Database 128 may be a relational database including one or more database tables that store data. Each table may have one or more table columns and zero or more database records. Each database record may include a primary key (or a primary key set) that uniquely identifies the database record from other database records in the table. Updater 130 tracks changes to database 128 and updates modification data 132 based on the changes. Modification data 132 is stored in a data storage device.

In an example, client 107 (e.g., an application external to application server 102) may invoke web service 122. Based on the client request, web service 122 may submit a query that selects data from or modifies database 128. A query may include an expressions clause (e.g., table columns from which or calculations that a client desires to retrieve), one or more database tables from which to retrieve the data requested by the client, and zero or more conditions clauses (e.g., condition(s) that must be met for a database record to be selected). In an example, a query may be a Structured Query Language (SQL) query of the form "SELECT Column1, Column2, ColumnX FROM Table1, Table2, TableY WHERE Condition1, Condition2, ConditionZ."

In FIG. 1, database 128 includes a table "Customers" 150, which includes column "Name" 152, column "Address" 154, and column "Age" 156. Table "Customers" 150 includes database records 162, 164, and 166 that store information about customers. Column "Name" 152 may be the primary key that uniquely identifies a database record in table "Customers" 150. For example, primary key "Hermione G." may uniquely identify database record 162 in table "Customers" 150. For brevity and simplicity, database 128 is shown as including one table. It should be understood, however, that database 128 may include more than one table, and each table may have zero or more database records.

III. The Web Service May Submit a Full Query or a Partial Query

Client 107 may request the services of web service 122, which may submit a query 140 to database 128 responsive to the request. Web service 122 may communicate with database server 104 in order to provide client 107 with a complete result set of the query. Web service 122 may issue, based on previously submitted queries and previously received query results, a full query or a partial query to database 128. If web service 122 has not received a full result set of the query from database server 104 yet, web service 122 may submit a full query to database 128. Web service 122 may check memory 124 to determine whether a full result set of the query has been received. Responsive to the full query, database server 104 may return the full result set of the query to web service 122. The full result set is the complete result set of data stored in database 128 satisfying the query.

In an example, web service 122 submits a full query if web service 122 has not yet submitted this query to database 128 and caches the full result set of the full query for later retrieval. Web service 122 may also be referred to as a client because it is requesting the services of the database. At a later point in time, because web service 122 has the full result set of the query, web service 122 may submit a partial query corresponding to the full query in order to receive a partial result set of the query. If web service 122 has received a full result set of the query from database server 104, web service 122 may submit a partial query to database 128. Responsive to the partial query, database server 104 may return a partial result set of the query to web service 122. The partial result set is a subset of the complete result set of the query and may include incremental updates based on the last result set sent to web service 122. Web service 122 may merge data from the full and partial result sets to obtain the final result set of the query. The partial result set is an incomplete result set of the partial query.

Web service 122 may submit a query 140 to database 128 and indicate in the query whether it is a full query or a partial query. Query 140 may indicate a query type of the query. For example, the query type may indicate that query 140 is a full query or a partial query. In an example, a full query may be "SELECT/*Query type=FQ*/Name, Address FROM Customers WHERE Customers.Age>20," and a partial query may be "SELECT /*Query type=PQ; FQID=304*/Name, Address FROM Customers WHERE Customers.Age>20." In this example, the full query and partial query includes a command to select data from a database table stored in database 128. A query may include a flag indicating whether the query is a full query or a partial query. In particular, the queries include a query type attribute indicating whether the query is a full query or a partial query. If the value of the query type attribute is a first value (e.g., "FQ"), query processor 126 may determine that the query is a full query. If the value of the query type attribute is a second value (e.g., "PQ"), query processor 126 may determine that the query is a partial query.

If web service 122 determines to submit a full query, web service 122 may insert "/*Query type=FQ*/" into the query to indicate that it is a full query. Additionally, each partial query corresponds to a full query. If web service 122 determines to submit a partial query, web service 122 may insert "/*Query type=PQ; FQID=304*/" into the query to indicate that it is a partial query. The partial query includes the identifier of the full query to which the partial query corresponds. In this example, the partial query corresponds to the full query assigned the identifier "304." A partial query and the full query to which the partial query corresponds may be the same, not taking into consideration the indication(s) of whether the query is a full query or a partial query. For example, both of the above example full and partial queries select values from the Name and Address columns in the Customers table, where the customer is over 20 years old.

IV. Process the Query

Query processor 126 may obtain query 140 and process it. In an example, query processor 126 determines whether query 140 is a full query or a partial query and processes the query accordingly. If query 140 is a full query, query processor 126 may return a full result set of the query to web service 122. In contrast, if query 140 is a partial query, query processor 126 may return a partial result set of the query to web service 122.

Figure 2:
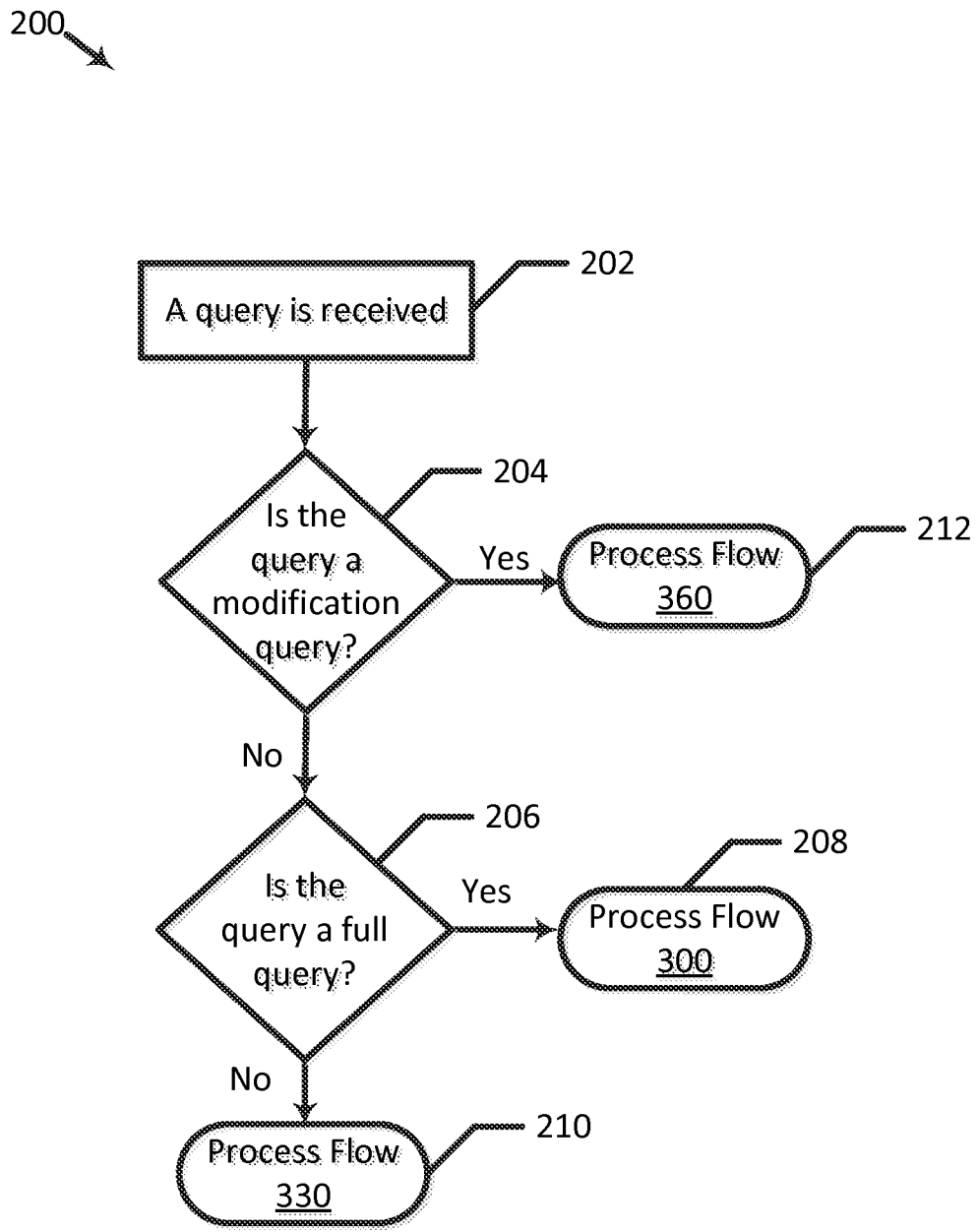
FIG. 2 is a process flow of a database server processing a query, according to some embodiments.

FIG. 2 illustrates a process flow 200 of database server 104 processing a query, according to some embodiments. At an action 202, a query is received. In an example, web service 122 sends query 140 to database 128, and query processor 126 receives the query. At an action 204, it is determined whether the query is a modification query. In an example, query processor 126 determines whether query 140 is a modification query.

A modification query may be a query that modifies database 128. In some examples, a modification query may be an insert command that inserts a set of one or more database records into one or more tables, a delete command that removes a set of one or more database records from one or more tables, or an update command that updates one or more values in a set of one or more database records in one or more tables. To determine whether a query is a modification query, query processor 126 reads the query. In an example, if a query includes a select command that selects data from database 128, query processor 126 may determine that the query is not a modification query. In contrast, if a query includes an insert, delete, or update command that modifies database 128, query processor 126 may determine that the query is a modification query.

A. Process a Full Query that Selects Data from the Database

Figure 3A:
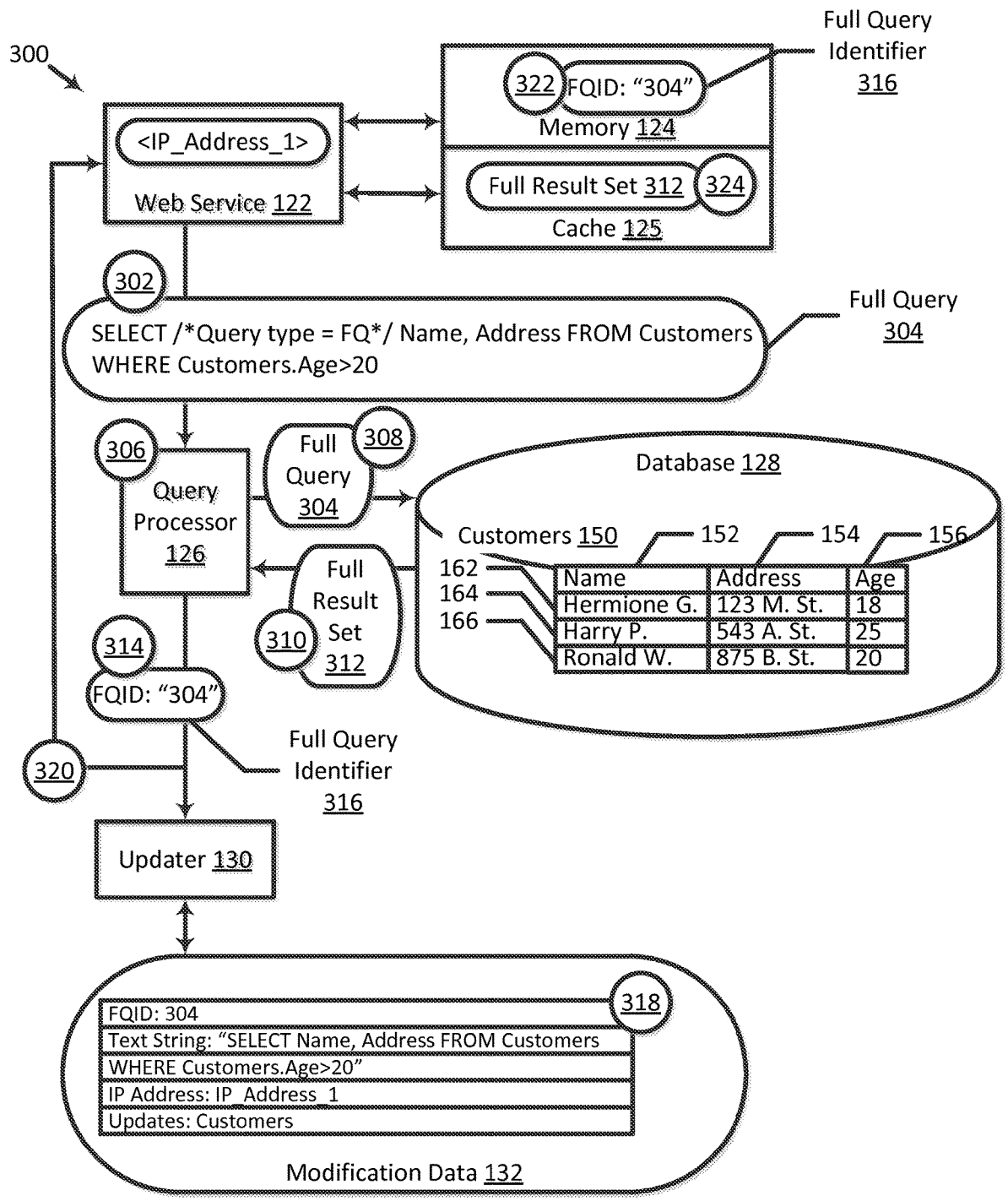
FIG. 3A is a process flow of the database server processing a full query, according to some embodiments.

At an action 206, it is determined whether the query is a full query. In an example, query processor 126 determines whether the query is a full query. At an action 208, process flow 200 proceeds from action 206 to a process flow 300 if the query is a full query and not a modification query. FIG. 3A illustrates process flow 300 of database server 104 processing a full query, according to some embodiments. In FIG. 3A, web service 122 has an internet protocol (IP) address "<IP_Address_1>." At an action 302, a full query 304 is sent to database server 104. In an example, web service 122 sends full query 304 to query processor 126. In FIG. 3A, full query 304 includes "SELECT/*Query type=FQ*/Name, Address FROM Customers WHERE Customers.Age>20." Full query 304 identifies the "Customers" table as the table from which to select data, and retrieves the names and addresses of customers who are over 20 years old.

At an action 306, a full query is received. In an example, query processor 126 receives full query 304. Query processor 126 may read the query and determine that it is a full query based on the query type (e.g., "FQ") indicated in the query. Additionally, query processor 126 may determine that the query is not a modification query because it includes a select command and does not modify database 128.

At an action 308, full query 304 is executed against database 128. In an example, query processor 126 executes full query 304 against database 128. Full query 304 is executed against table "Customers" 150 and the full result set includes data selected from the table satisfying the conditions of the query. In particular, data is selected from database record 164 because "Harry P." is over 20 years old.

At an action 310, a full result set 312 is obtained from the database. In an example, query processor 126 obtains full result set 312 of full query 304 from database 128. Full result set 312 is the complete result set of full query 304 and includes all of the data in database 128 satisfying the query. For example, full result set 312 includes "<Harry P., 543 A. St.>".

At an action 314, a full query identifier (FQID) is generated. In an example, query processor 126 generates a full query identifier 316 "304" that identifies full query 304. Query processor 126 may randomly generate a number that query processor 126 assigns to a full query as its identifier. Alternatively, query processor 126 may generate the full query identifier by tracking an identifier count and incrementing the count each time.

Additionally, receiving a full query may signal to updater 130 to track changes to tables identified in the full query (or a partial query) and update modification data 132 accordingly. At an action 318, modification data 132 may be updated based on full query 304. In an example, updater 130 identifies the one or more tables from which full query 304 selects data (e.g., table "Customers" 150) and any conditions clauses in the full query (e.g., the "WHERE" clause in full query 304) in order to determine which tables and/or table columns to check for changes. Updater 130 may update modification data 132 such that it includes data about updates to table "Customers" 150. Modification data 132 includes indications of which tables were modified by a modification query.

In FIG. 3A, modification data 132 includes the full query identifier that identifies the full query, the text string of the full query, the IP address associated with the full query, and any updates to the table identified in the full query (or a partial query). The IP address associated with the full query may be the IP address of the client that sent the full query. In an example, updater 130 may record "304" as the full query identifier that identifies full query 304, and the text string "SELECT Name, Address FROM Customers WHERE Customers.Age>20" of full query 304 into modification data 132. Updater 130 may also record "IP_Address_1" as the IP address associated with full query 304 and web service 122.

Updater 130 may identify table "Customers" 150 as the table from which data is selected based on full query 304 and record this table name into modification data 132. Additionally, updater 130 may identify column "Age" 156 as the table column from which data is selected based on full query 304 and record this table column name into modification data 132 (e.g., "Updates: Customers.Age"). Updater 130 may store any subsequent updates to table "Customers" 150 or to column "Age" 156 relative to the last result set sent to web service 122 into modification data 132. These updates may indicate which tables in database 128 were modified and how they were modified by a modification query. It should be understood that modification data 132 is an example of data that may be tracked and maintained by updater 130. In some examples, modification data 132 includes different data, more data, or less data than that shown. In an example, updater 130 does not store the IP address of the entity that sends the query.

At an action 320, the full result set and full query identifier are sent to the requesting entity that sent the query. In an example, query processor 126 sends full result set 312 and full query identifier 316 to web service 122. Web service 122 may receive full result set 312 and full query identifier 316. At an action 322, web service 122 stores full query identifier 316 "304" into memory 124. At an action 324, web service 122 stores full result set 312 into cache 125. Web service 122 may cache full result set 312 in cache 125 in order to retrieve the full result set quickly in the future. This is an example, and it should be understood that web service 122 may store both full result set 312 and full query identifier 316 into memory 124 or into cache 125. Alternatively, web service 122 may store full query identifier 316 "304" into cache 125 and store full result set 312 into memory 124. Web service 122 may retrieve full result set 312 of a query corresponding to full query identifier "304" at a later point in time.

B. Process a Partial Query that Selects Data from the Database

Figure 3B:
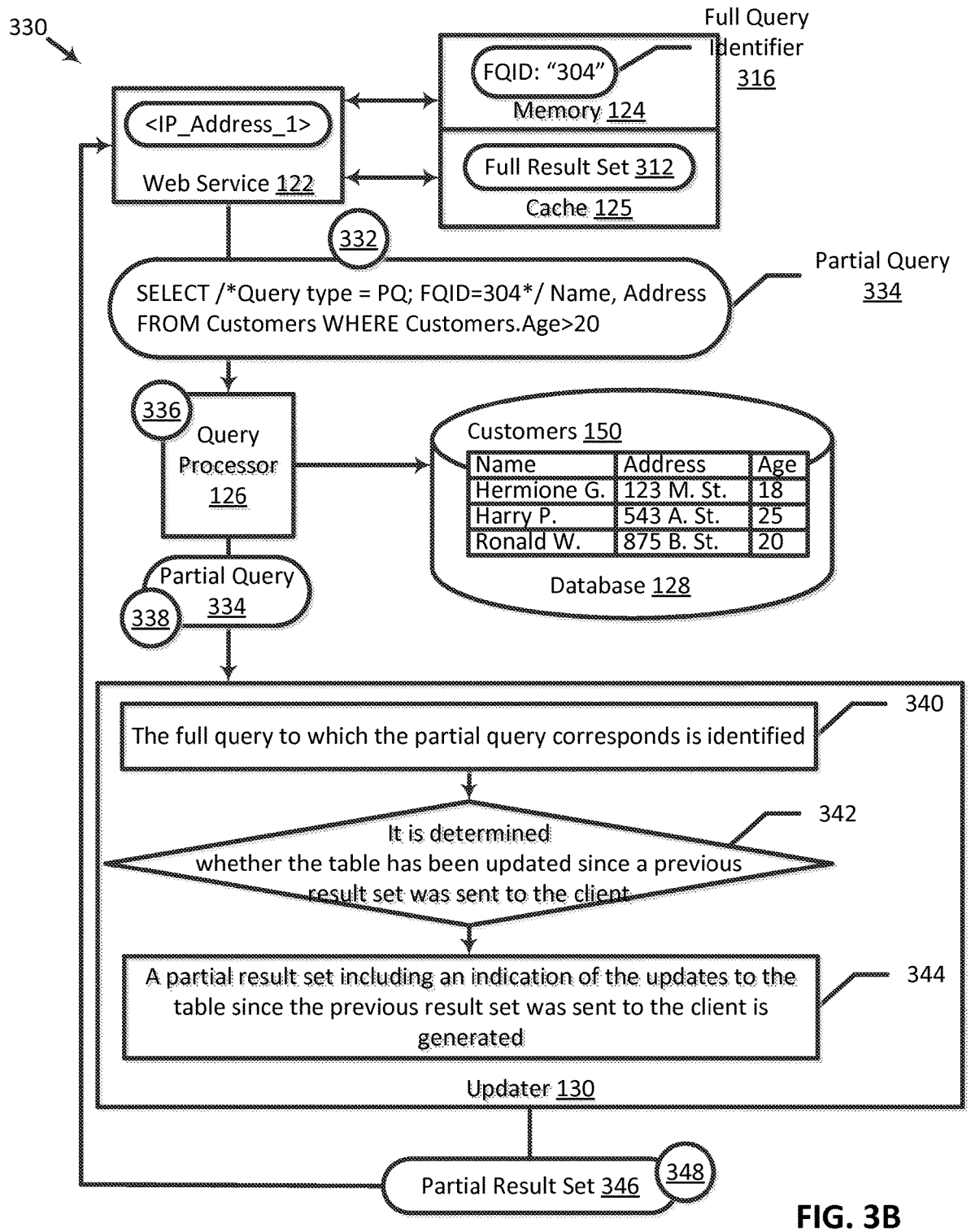
FIG. 3B is a process flow of the database server processing a partial query, according to some embodiments.

Referring back to FIG. 2, at an action 210, process flow 200 proceeds from action 206 to a process flow 330 if the query is not a full query and is not a modification query. If the query is not a full query, query processor 126 may determine that the query is a partial query. FIG. 3B illustrates process flow 330 of database server 104 processing a partial query, according to some embodiments.

Web service 122 may send the same query text string as that illustrated in FIG. 3A again to database server 104, but without the query type indication. Rather than receive a full result set, web service 122 may opt to send a partial query to database server 104 to obtain a partial result set. Web service 122 may retrieve from memory the full query to which the partial query corresponds and include the full query's identifier in the partial query.

At an action 332, a partial query 334 is sent to database server 104. In an example, web service 122 sends partial query 334 to query processor 126. In FIG. 3B, partial query 334 includes "SELECT /*Query type=FQ; FQID=304*/ Name, Address FROM Customers WHERE Customers.Age>20." Partial query 334 includes full query identifier "304," which identifies full query 304, and thus corresponds to full query 304. Web service 122 may retrieve FQID "304" from memory 124 and include this full query identifier in partial query 334 so that database server 104 will know to which full query this partial query corresponds. Similar to its corresponding full query, partial query 334 identifies the "Customers" table as the table from which to select data, and retrieves the names and addresses of customers who are over 20 years old.

At an action 336, a partial query is received. In an example, query processor 126 receives partial query 334. Query processor 126 may read the query and determine that it is a partial query based on the query type (e.g., "PQ") indicated in the query and may also determine that the partial query corresponds to the full query identified by the full query identifier "304" included in the partial query. Additionally, query processor 126 may determine that the query is not a modification query because it includes a select command that does not modify database 128.

At an action 338, partial query 334 is sent to updater 130 to determine the partial result set of the query to return to web service 122. In an example, query processor 126 sends partial query 334 to updater 130 to determine the partial result set of partial query 334 to return to web service 122.

At an action 340, the full query to which the partial query corresponds is identified. In an example, updater 130 compares full query identifier value(s) (e.g., "304") in modification data 132 with the full query identifier included in partial query 334 (e.g., "304"), and determines whether any of the full query identifiers in modification data 132 match the full query identifier 206 included in partial query. If a full query identifier identified in modification data 132 matches the full query identifier 206 included in partial query 334, updater 130 may determine that the partial query corresponds to the matching full query. In this example, updater 130 may identify full query 304 as the full query to which partial query 334 corresponds because the full query identifier "304" in modification data 132 matches the full query identifier included in partial query 334.

In another example, updater 130 compares the text string of full query 304 (e.g., SELECT Name, Address FROM Customers WHERE Customers.Age>20) identified in modification data 132 with partial query 334 (e.g., SELECT Name, Address FROM Customers WHERE Customers.Age>20), without taking into consideration the indication(s) of whether the query is a full query or a partial query, and determines whether they match. If the text strings of full query 304 and partial query 334 match, updater 130 may determine that partial query 334 corresponds to full query 304.

At an action 342, it is determined whether the table has been updated since a previous result set was sent to the client. In an example, updater 130 determines whether table "Customers" 150 has been updated since a previous result set was sent to the client. At an action 344, a partial result set including an indication of the updates to the table since the previous result set was sent to the client is generated. In an example, updater 130 generates partial result set 346 based on the updates to table "Customers" 150. At an action 348, partial result set 346 is sent to the requesting entity that sent the query. The partial result set is an incomplete result set of the partial query. In an example, updater 130 sends partial result set 346 to web service 122, the entity that sent partial query 334.

If modification data 132 indicates that table "Customers" 150 (or the table column "Age" 156) has not been updated since the last result set that was sent to the entity assigned to "IP_Address_1," then updater 130 may determine that no updates to table "Customers" 150 have occurred, and thus partial result set may be empty. In this example, web service 122 already has the final result set of partial query 334 (e.g., full result set 312) in cache 125. Updater 130 sends partial result set 346, which is empty, to web service 122. In another example, if partial result set 346 is empty, updater 130 sends a message to web service 122 informing it that the previously sent full result set corresponding to the partial query is the final result set of partial query 334. Thus, no additional data is needed for partial query 334, and web service 122 may return full result set 312, which is cached, to the requesting client.

C. Process a Modification Query that Modifies the Database

Figure 3C:
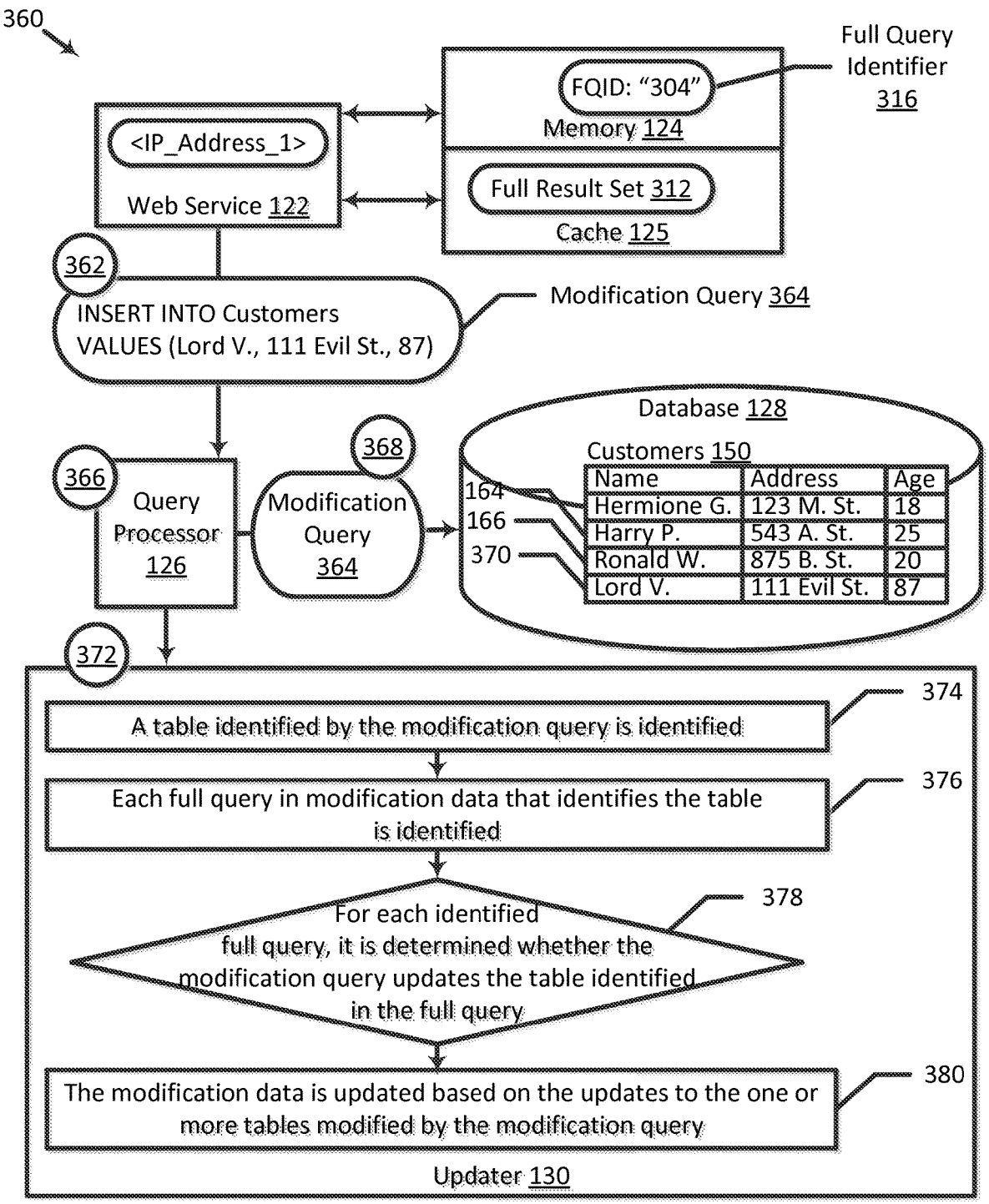
FIG. 3C is a process flow of the database server processing a modification query, according to some embodiments.

Referring back to FIG. 2, at an action 212, process flow 200 proceeds from action 206 to a process flow 360 if the query is a modification query. FIG. 3C illustrates process flow 360 of database server 104 processing a modification query, according to some embodiments. At an action 362, a modification query 364 is sent to database server 104. In an example, web service 122 sends, based on a client request, modification query 364 to query processor 126. For example, a client may invoke the services of web service 122 to obtain data, and web service 122 may send a query to database server 104 to retrieve the data. In FIG. 3C, modification query 364 includes "INSERT INTO Customers VALUES (Lord V., 111 Evil St., 87)." Modification query 364 identifies the "Customers" table as the table stored in database 128 to modify.

At an action 366, a modification query is received. In an example, query processor 126 receives modification query 364. Query processor 126 may read the query and determine that it is a modification query because it includes an insert command that modifies database 128. At an action 368, modification query 364 is executed against database 128. In an example, query processor 126 executes modification query 364 against database 128. Modification query 364 is executed against table "Customers" 150, and a database record 370 is inserted into table "Customers" 150 based on modification query 364.

At an action 372, modification query 364 is sent to updater 130 to determine whether to update modification data 132. In an example, query processor 126 sends modification query 364 to updater 130 to determine whether to update modification data 132. At an action 374, a table identified by the modification query is identified. In an example, updater 130 identifies table "Customers" 150 in modification query 364. At an action 376, each full query in the modification data that identifies the table is identified. In an example, updater 130 identifies each full query in modification data 132 that identifies table "Customers" 150. Referring to FIG. 3A, modification data 132 indicates that full query "304" identifies table "Customers" 150.

At an action 378, for each identified full query, it is determined whether the modification query updates the table identified in the full query. In an example, for each identified full query, updater 130 determines whether modification query 364 updates table "Customers" 150 identified in the full query. The insertion of database record 370 into table "Customers" 150 updates table column "Age" 156 because it adds a value "87" to the column.

Figure 4A:
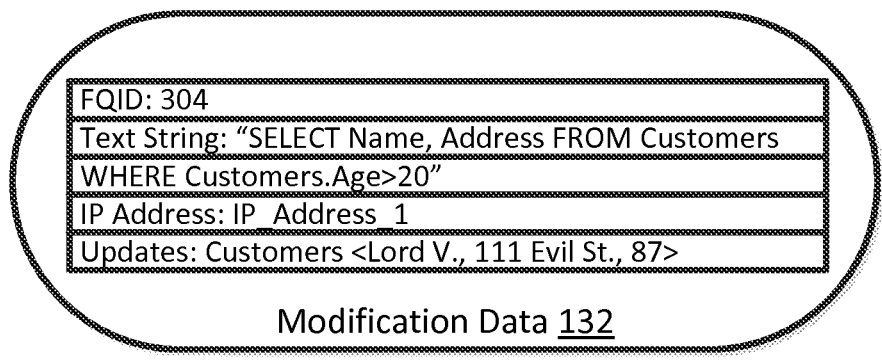
FIG. 4A illustrates modification data after it has been updated by an updater, according to some embodiments.

At an action 380, the modification data is updated based on the updates to the one or more tables modified by the modification query. In an example, updater 130 updates modification data 132 based on the updates to the one or more tables modified by the modification query. For example, updater 130 may update modification data 132 to indicate that table "Customers" 150 includes the additional database record 370 (and to indicate that other tables, if any, were also modified by the modification query. FIG. 4A illustrates modification data 132 after it has been updated by updater 130, according to some embodiments. In FIG. 4A, updater 130 may store the added database record ("<Lord V., 111 Evil St., 87>") into modification data 132.

D. Retrieve the Partial Result Set of the Query

1. Insert Modification Query

At this point in time, modification data 132 indicates the differences in table "Customers" 150 before and after modification query 364 is executed at database. If web service 122 were to submit partial query 334 to database server 104 after modification query 364 has been executed at database 128, database server 104 may gain the benefit of already having sent full result set 312 of the query to web service 122. For example, updater 130 may look to modification data 132 to determine incremental updates to table "Customers" 150 since the last result set was sent to web service 122, and send these incremental updates to web service 122.

In an example, updater 130 identifies the full query identifier "304" in partial query 334 and determines whether the table identified in partial query 334 has been updated by looking in modification data 132. Updater 130 generates a partial result set based on the update(s) to table "Customers" 150. In keeping with the above example, database record 370 has been added to table "Customers" 150 based on modification query 364, and modification data 132 reflects this addition in FIG. 4A. Updater 130 recognizes that one database record has been inserted into table "Customers" 150 and determines that the age of customer "Lord V." is over 20 years.

Updater 130 may retrieve the partial result set in a variety of ways. In an example, updater 130 executes a "narrower" query against database 128 and retrieves the name and address of database record 370 corresponding to modification data 132. In this example, updater 130 may recognize that "Lord V." is the primary key, execute a query including "SELECT Name, Address from Customers where Name="Lord V.," and obtain "<Lord V., 111 Evil St.>" as the partial result set of the partial query. In another example, updater 130 recognizes that database record 270 includes the name and address of the customer over 20 years old and generates a partial result set from modification data 132. In this example, the partial result set is "<Lord V., 111 Evil St.>." In another example, updater 130 executes partial query 334 against database 128, obtains a full result set of the query, and discards all database records from the obtained result set satisfying the query except those that correspond to the updates indicated in modification data 132. In this example, updater 130 obtains "<Lord V., 111 Evil St.>" as the partial result set of the partial query.

Figure 4B:
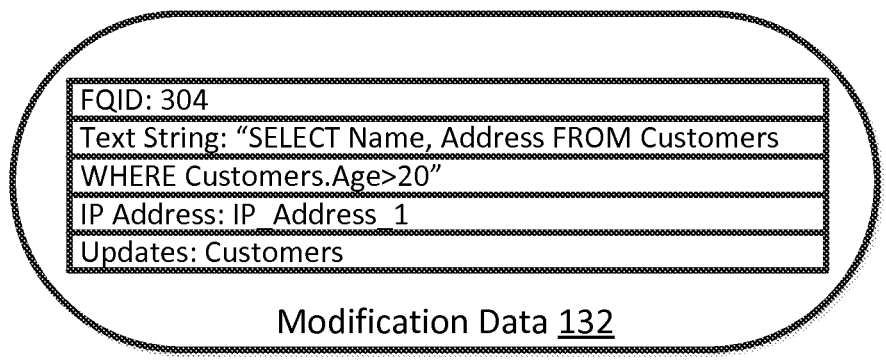
FIG. 4B illustrates the modification data after the updater has removed the update indication(s), according to some embodiments.

Updater 130 generates the partial result set based on the obtained results and sends the partial result set to web service 122. The partial result set includes "<Lord V., 111 Evil St.>." Updater 130 maintains modification data 132 such that it includes updates since the last result set was sent to web service 122. After the partial result set is sent to web service 122, updater 130 may then remove the update indication(s) from modification data 132. FIG. 4B illustrates modification data 132 after updater 130 removes the update indication(s), according to some embodiments. Updater 130 may reset the changes to modification data 132 to indicate the table "Customers" 150 has not been updated since the last result set was sent to web service 122. This may save memory space, and reduce the amount of data sent to web service 122. Updater 130 may update modification data 132 based on subsequently received modification queries that updated table "Customers" 150. When a result set based on a partial query or a full query is sent to web service 122, updater 130 deletes the indications that table "Customers" 150 has been updated.

Web service 122 receives the partial result set, retrieves full result set 312 (or a previous final result set) from memory 124, and merges the result sets together to determine a final result set. Full result set 312 is "<Harry P., 543 A St.>," the partial result set is "<Lord V., 111 Evil St.>," and the final result set is "<Harry P., 543 A St.>, <Lord V., 111 Evil St.>." In this example, the partial result set is a subset of full result set 312. Web service 122 caches the final result set, and sends the final result set to the client. Accordingly, at a later point in time, if web service 122 sends partial query 334 to database server 104 again, web service 122 already has "<Harry P., 543 A St.>, "<Lord V., 111 Evil St.>" stored in cache 125, and database server 104 will send the incremental updates that have occurred to table "Customers" 150 since the last result set was sent to web service 122. Additionally, web service 122 gains the benefit of having cached the final result set. For example, web service 122 may retrieve final result sets faster because database server 104 may obtain partial result sets faster than full results sets. Additionally, less data is transmitted over the network.

2. Delete Modification Query

Although the above example may describe the modification query as being an insert command, the above description applies as well to delete and update commands. In another example, web service 122 sends a modification query that removes database record 164 from table "Customers" 150 in FIG. 3C. In this example, query processor 126 receives the modification query including the delete command, and executes it against database 128. Accordingly, table "Customers" 150 is left with database records 162, 166, and 370. Updater 130 updates modification data 132 based on the modification query by including an indication that database record 164 has been removed. In an example, updater 130 may update modification data 132 to store a database record "<Harry P., DELETE>."

If web service 122 sends partial query 334 to database server 104 after database record 164 has been removed, updater 130 may look in modification data 132 and determine that the database record having "Harry P." as the primary key has been removed. Accordingly, updater 130 may generate a partial result set including data indicating that the database record having "Harry P." as the primary key has been removed, and send the partial result set to web service 122. In this example, updater 130 may send the partial result set, "<Harry P., DELETE>," to web service 122. After updater 130 sends the partial result set to web service 122, updater 130 may then remove the update indication(s) corresponding to the partial result set sent to the client from modification data 132 (see FIG. 4B). After updater 130 removes the update indication(s), modification data 132 indicates that no changes to table "Customers" 150 have occurred since the last result set was sent to web service 122.

Web service 122 receives the partial result set, and merges the partial result set with the full result set to determine a final result set. In this example, web service 122 retrieves full result set 312, which is "<Harry P., 543 A St.>, <Lord V., 111 Evil St.>," from cache 125. Based on the partial result set, web service 122 removes the database record having "Harry P." as the primary key from the full result set and stores this updated full result set of the query as the final result set into cache 125. Web service 122 sends the final result set of the query, which is "<Lord V., 111 Evil St.>," to the client. If web service 122 sends partial query 334 to database server 104 again, web service 122 has the final result set of the query cached and retrieves the final result set ("<Lord V., 111 Evil St.>") to merge with the partial result set from updater 130.

3. Update Modification Query

In another example, web service 122 sends a modification query that updates database record 164 in table "Customers" 150 in FIG. 3C. In this example, query processor 126 receives the modification query including the update command, and executes it against database 128. For example, the modification query may be "UPDATE Customers SET Age=21 WHERE Name='Ronald W,'" and updates the value in the Age column of database record 166 to "21." Updater 130 updates modification data 132 based on the modification query by including an indication that database record 166 has been updated. In some examples, updater 130 may include an indication that the age of the customer has been updated. In an example, updater 130 may update modification data 132 to store a database record "<Name=Ronald W., Age=21>."

If web service 122 sends partial query 334 to database server 104 after database record 166 has been updated, updater 130 may look in modification data 132 and determine that the database record having "Ronald W." as the primary key has been updated. Accordingly, updater 130 may generate a partial result set including data indicating that the value of the Age column of the database record having "Ronald W." as the primary key has been updated to "21," and send the partial result set to web service 122. In this example, updater 130 may send the partial result set, "<Ronald W., 875 B. St.>," to web service 122. After updater 130 sends the partial result set to web service 122, updater 130 may then remove the update indication(s) corresponding to the partial result set sent to the client from modification data 132 (see FIG. 4B). After updater 130 removes the update indication(s), modification data 132 indicates that no changes to table "Customers" 150 have occurred since the last result set was sent to web service 122.

Updater 130 may retrieve the partial result set in a variety of ways. In an example, updater 130 executes a "narrow" query against database 128 and retrieves the name and address of database record 166 corresponding to modification data 132. In this example, updater 130 may recognize that "Ronald W." is the primary key, execute a query including "SELECT Name, Address from Customers where Name="Ronald W.," and obtain "<Ronald W., 875 B. St.>" as the partial result set of the partial query. In another example, updater 130 executes the partial query against database 128, obtains a full result set of the query, and discards all database records from the obtained result set satisfying the query except those that correspond to the updates indicated in modification data 132. In this example, updater 130 obtains "<Ronald W., 875 B. St.>" as the partial result set of the partial query.

After updater 130 sends the partial result set to web service 122, updater 130 may then remove the update indication(s) corresponding to the partial result set sent to the client from modification data 132 (see FIG. 4B). After updater 130 removes the update indication(s), modification data 132 indicates that no changes to table "Customers" 150 have occurred since the last result set was sent to web service 122.

Web service 122 receives the partial result set, retrieves full result set 312 (or a previous final result set) from memory 124, and merges the result sets together to determine a final result set. Full result set 312 is "<Harry P., 543 A St.>, <Lord V., 111 Evil St.>," the partial result set is "<Ronald W., 875 B. St.>," and the final result set is "<Harry P., 543 A St.>, <Lord V., 111 Evil St.>, "<Ronald W., 875 B. St.>." In this example, web service 122 caches the final result set in cache 125. Accordingly, if web service 122 sends partial query 334 to database server 104 again, web service 122 already has "<Ronald W., 875 B. St.>" cached. Web service 122 sends the final result set of the query, which is "<Lord V., 111 Evil St.>, "<Ronald W., 875 B. St.>, <Harry P., 543 A. St.>" to the client.

As discussed above and further emphasized here, FIGS. 1, 2, 3A-4B are merely examples, which should not unduly limit the scope of the claims. For example, it should be understood that one or more modules or components in FIG. 1 (e.g., query processor 126 and updater 130) may be combined with another module or component. It should also be understood that one or more modules or components in FIG. 1 may be separated into more than one module or component. Additionally, query processor 126 and updater 130 may reside on different computing devices. In an example, query processor 126 and updater 130 may communicate over a network.

V. Example Method

Figure 5:
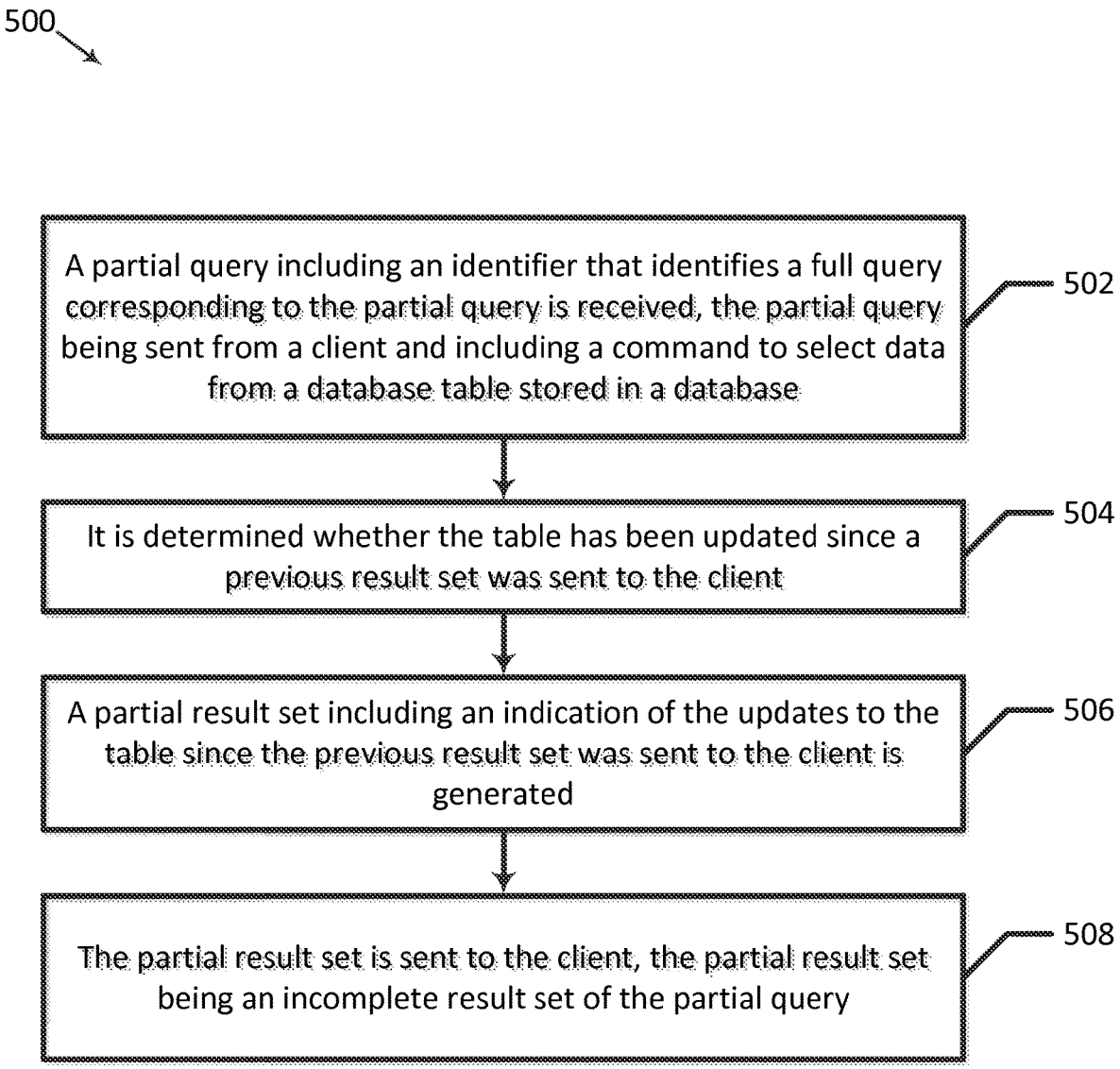
FIG. 5 is a flowchart illustrating a method of processing a query, according to some embodiments.

FIG. 5 is a flowchart illustrating a method 500 of processing a query, according to some embodiments. Method 500 is not meant to be limiting and may be used in other applications.

In FIG. 5, method 500 includes blocks 502-508. In a block 502, a partial query including an identifier that identifies a full query corresponding to the partial query is received, the partial query being sent from a client and including a command to select data from a database table stored in a database. In an example, database server 104 receives partial query 334 including full query identifier "304" that identifies full query 304 corresponding to partial query 334, partial query 334 being sent from web service 122 and including a command to select data from table "Customers" 150 stored in database 128.

In a block 504, it is determined whether the table has been updated since a previous result set was sent to the client. In an example, database server 104 determines whether table "Customers" 150 has been updated since a previous result set was sent to web service 122. In a block 506, a partial result set including an indication of the updates to the table since the previous result set was sent to the client is generated. In an example, database server 104 generates a partial result set including an indication of the updates to table "Customers" 150 since the previous result set was sent to web service 122. In a block 508, the partial result set is sent to the client, the partial result set being an incomplete result set of the partial query. In an example, database server 104 sends the partial result set to web service 122, the partial result set being an incomplete result set of partial query 334.

In some embodiments, one or more actions illustrated in blocks 502-508 may be performed for any number of partial queries received by database server. Additionally, it is also understood that additional processes may be inserted before, during, or after blocks 502-508 discussed above. It is also understood that one or more of the blocks of method 500 described herein may be omitted, combined, or performed in a different sequence as desired.

VI. Example Computing System

Figure 6:
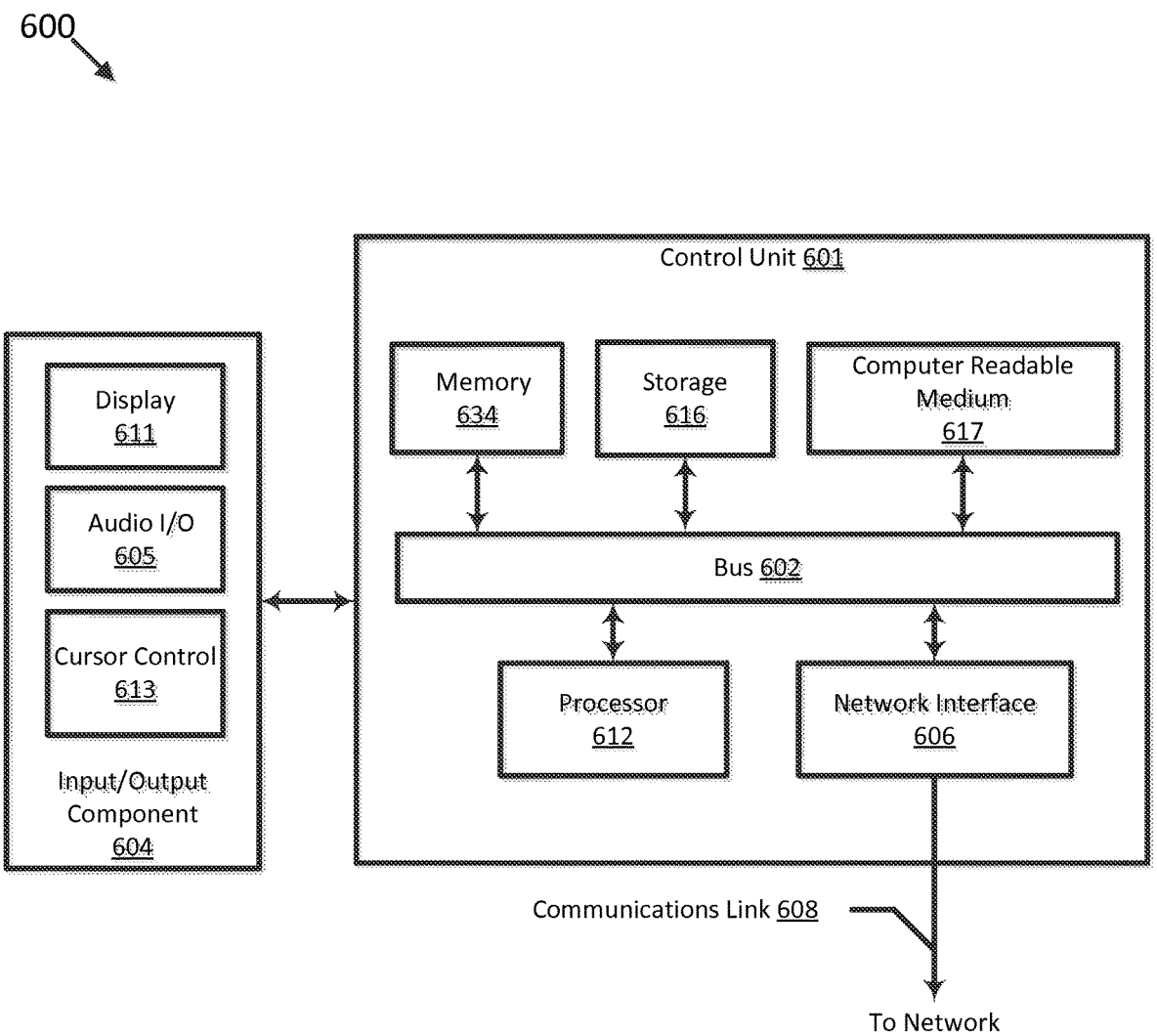
FIG. 6 is a block diagram of an electronic system suitable for implementing one or more embodiments of the present disclosure.

FIG. 6 is a block diagram of a computer system 600 suitable for implementing one or more embodiments of the present disclosure. Each of query processor 126, updater 130, and web service 122 may execute on a computing device. The computing device may include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the application server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. In an example, query processor 126 and updater 130 may communicate using bus 602. A processor 612, which may be a micro-controller, digital signal processor (DSP), or other processing component, processes these various signals, such as for display on computer system 600 or transmission to other devices via communications link 608. Components of computer system 600 also include a system memory component 634 (e.g., RAM), a static storage component 616 (e.g., ROM), and/or a disk drive 617. Computer system 600 performs specific operations by processor 612 and other components by executing one or more sequences of instructions contained in system memory component 634. For example, portions of query processor 126 and updater 130 may reside in memory 634 and may execute on processor 612. In another example, portions of web service 122 may reside in memory 634 and may execute on processor 612.

Components include an input/output (I/O) component 604 that processes a user action, such as selecting keys from a keypad/keyboard, selecting one or more buttons or links, etc., and sends a corresponding signal to bus 602. I/O component 404 may include an output component such as a display 611, and an input control such as a cursor control 613 (such as a keyboard, keypad, mouse, etc.). An optional audio I/O component 605 may also be included to allow a user to use voice for inputting information by converting audio signals into information signals. Audio I/O component 605 may allow the user to hear audio. A transceiver or network interface 606 transmits and receives signals between computer system 600 and other devices via a communications link 608 to a network. In an embodiment, the transmission is wireless, although other transmission mediums and methods may also be suitable.

Logic may be encoded in a computer readable medium 617, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 634, and transmission media includes coaxial cables, copper wire, and fiber optics, including wires that include bus 602. In an embodiment, the logic is encoded in non-transitory computer readable medium. Transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. In various embodiments of the present disclosure, execution of instruction sequences (e.g., method 500) to practice the present disclosure may be performed by computer system 600. In various other embodiments of the present disclosure, a plurality of computer systems 600 coupled by communications link 608 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable media. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of processing a query, comprising:
receiving, at a database server, a full query including a command to select from a set of database tables one or more records satisfying a set of conditions, the full query being sent from a web service, and the set of database tables being stored in a database;
modifying the set of database tables in response to receiving a set of modification queries, the modifying including at least one of inserting one or more records into the set of database tables or removing one or more records from the set of database tables;
updating modification data stored in a data storage device different from the database, wherein the updating includes storing an indication of data inserted into or removed from one or more columns of the set of database tables in accordance with the set of modification queries;
receiving, at the database server, a partial query including an identifier that identifies the full query, the partial query being sent from the web service and including the command;

determining, based on the modification data, whether the set of database tables has been updated since a previous result set was sent to the web service;
generating a partial result set including an indication of the updates to the set of database tables since the previous result set was sent to the web service;
sending the partial result set to the web service, the partial result set being an incomplete result set of the partial query; and
after sending the partial result set to the web service, removing the indication from the modification data;
wherein the partial query includes a condition, and wherein generating the partial result set includes:
identifying primary key data of a column of the one or more columns, the primary key data being stored in the modification data;
generating a first query by replacing the condition in the partial query with a condition specifying records matching the primary key data; and
executing the first query against the database, wherein the partial result set is a result set of the first query.

2. The method of claim 1, further including:
executing the full query against the set of database tables;
obtaining, based on the executing, a full result set of the full query; and
sending the full result set and the identifier to the web service, wherein the previous result set is the full result set.

3. The method of claim 2, further including:
recording the identifier and a name of at least one table identified in the full query in the data storage device.

4. The method of claim 2, further including:
receiving, at the database server, a modification query of the set of modification queries, the modification query modifying at least one table of the set of database tables; and
executing the modification query against the at least one table, wherein the updating modification data includes tracking updates to the at least one table via the modification data, and the updates to the at least one table are in accordance with the modification query.

5. A system for processing a query, comprising:
a non-transitory memory; and
one or more hardware processors coupled to the non-transitory memory and configured to read instructions from the non-transitory memory to cause the system to perform operations comprising:
receiving, at a database server, a full query including a command to select from a set of database tables one or more records satisfying a set of conditions, the full query being sent from a web service, and the set of database tables being stored in a database;
modifying the set of database tables in response to receiving a set of modification queries, the modifying including at least one of inserting one or more records into the set of database tables or removing one or more records from the set of database tables;
updating modification data stored in a data storage device different from the database, wherein the updating includes storing a first indication of the modified set of database tables and a second indication of data inserted into or removed from one or more columns of the set of database tables in accordance with the set of modification queries;
receiving, at the database server, a partial query including an identifier that identifies the full query, the partial query being sent from the web service and including the command;
determining, based on the modification data, whether the set of database tables has been updated since a previous result set was sent to the web service;
generating a partial result set including an indication of the updates to the set of database tables since the previous result set was sent to the web service;
sending the partial result set to the web service, the partial result set being an incomplete result set of the partial query;
after sending the partial result set to the web service, removing the indication from the modification data;
identifying primary key data of a column of the one or more columns, the primary key data being stored in the modification data;
generating a first query by replacing the condition in the partial query with a condition specifying records matching the primary key data; and
executing the first query against the database, wherein the partial result set is a result set of the first query.

6. The system of claim 5, the operations further comprising:
executing the full query against the set of database tables;
obtaining, based on the execution, a full result set of the full query; and
sending the full result set and the identifier to the web service, wherein the previous result set is the full result set.

7. The system of claim 6, the operations further comprising:
storing the identifier and a name of at least one table identified in the full query into the data storage device.

8. The system of claim 7, the operations further comprising:
receiving, at the database server, a modification query of the set of modification queries, the modification query modifying at least one table of the set of database tables; and
executing the modification query against the at least one table, wherein the updating modification data includes tracking updates to the at least one table via the modification data, and the updates to the at least one table are in accordance with the modification query.

9. The system of claim 8, the operations further comprising:
for each full query in the modification data that identifies a table of the at least one table:
determining whether the modification query updates the respective table; and
updating the modification data based on updates to the respective table.

10. The system of claim 6, wherein the web service caches the full result set, retrieves the full result set from the cache, and merges the full result set with the partial result set to determine a final result set to send to a client that submitted the command in the partial query.

11. A non-transitory machine-readable medium comprising a plurality of machine-readable instructions that when executed by one or more processors is adapted to cause the one or more processors to perform a method comprising:
receiving, at a database server, a full query including a command to select from a set of database tables one or more records satisfying a set of conditions, the full query being sent from a web service, and the set of database tables being stored in a database;

modifying the set of database tables in response to receiving a set of modification queries, the modifying including at least one of inserting one or more records into the set of database tables or removing one or more records from the set of database tables;

updating modification data stored in a data storage device different from the database, wherein the updating includes storing an indication of data inserted into or removed from one or more columns of the set of database tables in accordance with the set of modification queries;

receiving, at the database server, a partial query including an identifier that identifies the full query, the partial query being sent from the web service a client and including the command;

determining, based on the modification data, whether the set of database tables has been updated since a previous result set was sent to the web service;

generating a partial result set including an indication of the updates to the set of database tables since the previous result set was sent to the web service;

sending the partial result set to the web service, the partial result set being an incomplete result set of the partial query;

after sending the partial result set to the web service, removing the indication from the modification data;

identifying primary key data of a column of the one or more columns, the primary key data being stored in the modification data;

generating a first query by replacing the condition in the partial query with a condition specifying records matching the primary key data; and executing the first query against the database, wherein the partial result set is a result set of the first query.

12. The method of claim 1, wherein the partial result set is different from a full result set of the full query.

13. The method of claim 1, wherein the full query and the partial query include the same expressions clause, the same set of database tables from which to retrieve the data requested by the web service, and the same set of conditions.

14. The method of claim 1, further comprising:

after removing the indication from the modification data:

modifying the set of database tables in response to receiving a second modification query by at least one of inserting one or more records into the set of database tables or removing one or more records from the set of database tables;

after modifying the set of database tables in response to receiving the second modification query, receiving, a second partial query including the identifier and the command, the second partial query being sent from the web service;

updating the modification data based on the second modification query by storing a second indication of data inserted into or removed from one or more columns of the set of database tables in accordance with the second modification query;

generating, based on the updated modification data based on the second modification query, a second partial result set including an indication of the updates to the set of database tables since the partial result set was sent to the web service; and sending the second partial result set to the web service, the second partial result set being an incomplete result set of the second partial query and being different from the first partial result set.

* * * * *